J. ATKINS.
Harvester.
No. 12,756.            Patented April 24, 1855.
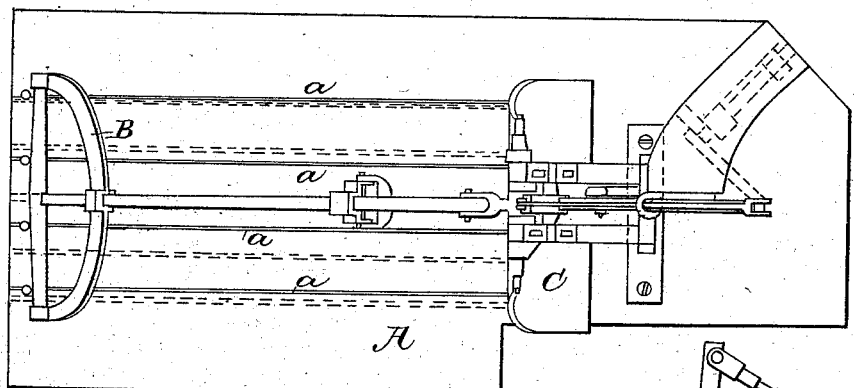
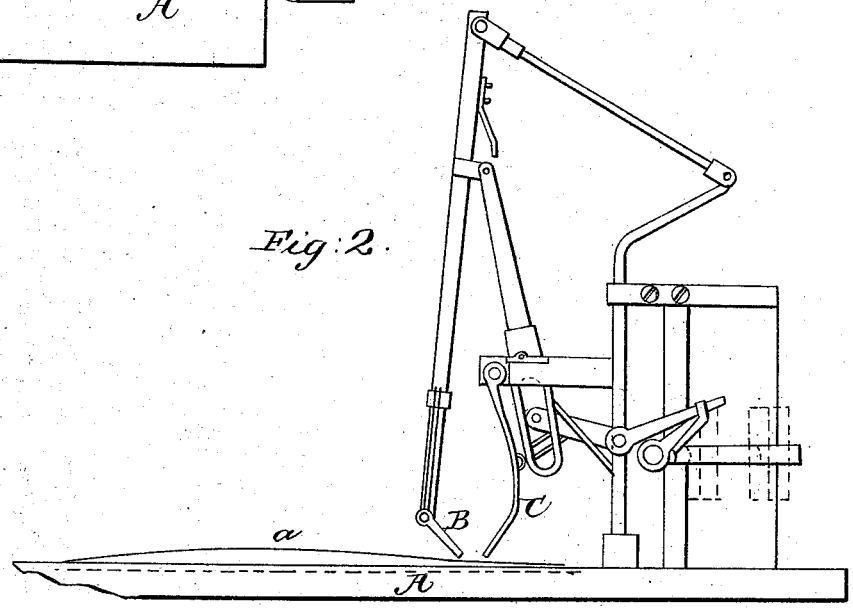
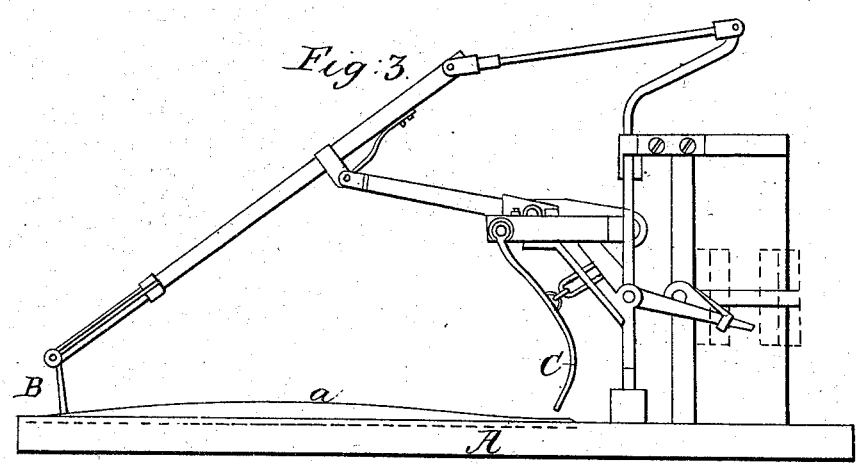

UNITED STATES PATENT OFFICE.

JEARUM ATKINS, OF CHICAGO, ILLINOIS.

IMPROVEMENT IN PLATFORMS OF GRAIN-HARVESTERS.

Specification forming part of Letters Patent No. 12,756, dated April 24, 1855.

*To all whom it may concern:*

Be it known that I, JEARUM ATKINS, of Chicago, in the county of Cook and State of Illinois, have invented a new and useful Improvement in Platforms of Harvesting-Machines; and I do hereby declare that the following is a full, clear, and exact description of the construction and operation of the same, reference being had to the annexed drawings, forming part of this specification, in which—

Figure 1 is a plan of platform, rake, and palm. Fig. 2 is a side elevation of the same with the rake and palm closed. Fig. 3 is a side elevation with rake and palm separated.

Similar letters of reference in the several figures denote the same part of the machine.

This invention consists in combining with the rake and palm secured to me by Patent No. 9,479, dated December 21, 1852, raised ribs upon the platform of the machine running in the direction of the motion of the rake, across which ribs the grain will be deposited as it is cut, leaving a small space between the straw and platform, so that the teeth of the rake can pass beneath the straw, thus obviating the slipping of the rake over the straw and imperfect raking, which will obtain when the straw is suffered to fall on the surface of the platform; or, instead of these ribs, strips might be cut out of the platform, in which openings the rake-teeth might pass, as between the ribs, by which means the same effect could be produced; or these ribs may be used in reapers when the raking is done by hand.

To enable others skilled in the art to make and use my invention, I will proceed to describe its construction and operation.

In the drawings, A is the platform; B, the rake, and C the palm, the construction and operation of which are fully described in my patent of December 21, 1852.

On the platform A are secured the ribs *a*, the number proportional to the dimensions of the machine. These ribs curve upward from the platform, being highest at or near their middle portions, as shown in Figs. 2 and 3, to facilitate the passing of the rake, but their edges may be horizontal and parallel; or strips may be cut out of the platform where the rake-teeth are designed to pass, as shown by the red lines. These ribs may be placed upon the platform parallel with the finger-board on the cutters, or curved in the direction in which the grain is to be raked.

The operation of my improvement is as follows: As the machine moves forward the cut grain falls across the ribs *a*, leaving a small space between the straw and surface of the platform. Now as the rake and palm pass from the positions shown in Fig. 3 to those exhibited in Fig. 2 the rake will pass entirely around the straw, and the ribs serving to elevate the cut grain or straw from the surface of the platform, the teeth of the rake pass under the straw and enable the rake and palm effectually to gather the same. The same effect would be produced if the grain fell upon the platform instead of the ribs, the teeth of the rake traversing spaces cut out for them in the platform. The operation of discharging the gavel being fully described in my patent of December 21, 1852, and not being an act of the combination here considered, need not be described; or, if the raking is to be done by hand, the teeth of the rake pass under the grain in like manner.

The advantage of the before-described combination is, the prevention of the slipping of the rake over the straw from the inability of the teeth to pass entirely under it. This slipping prevents the removal of the entire body of grain as the rake sweeps over the platform, and is a serious detriment to the successful operation of the machine.

What I claim as my invention, and desire to secure by Letters Patent, is—

The bars or ribs, or their equivalent, on the platform of reapers in rear of the knife, in combination with a rake actuated by hand or by machinery and moving above the platform, the ribs being either straight or curved, but parallel, or nearly so, to the travel of the teeth of the rake.

In testimony whereof I have hereunto signed my name before two subscribing witnesses.

JEARUM ATKINS.

Witnesses:
J. A. HOISINGTON,
GEO. SCOOVILLE.